(12) United States Patent
Phang et al.

(10) Patent No.: US 9,009,141 B2
(45) Date of Patent: Apr. 14, 2015

(54) DISPLAY APPARATUS AND DISPLAYING METHOD OF CONTENTS

(75) Inventors: Joon-ho Phang, Seoul (KR); Dae-hyun Kim, Suwon-si (KR); Yeo-ri Yoon, Suwon-si (KR); Chang-soo Lee, Seoul (KR); Sang-hee Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 559 days.

(21) Appl. No.: 13/110,145

(22) Filed: May 18, 2011

(65) Prior Publication Data
US 2012/0059818 A1    Mar. 8, 2012

(30) Foreign Application Priority Data
Sep. 7, 2010    (KR) .................. 10-2010-0087516

(51) Int. Cl.
*G06F 17/30* (2006.01)
(52) U.S. Cl.
CPC .... *G06F 17/30265* (2013.01); *G06F 17/30241* (2013.01)
(58) Field of Classification Search
CPC .......... G06F 17/30241; G06F 17/3089; G06F 17/30265; G06F 17/3087
See application file for complete search history.

(56) References Cited

U.S. PATENT DOCUMENTS

| | | | |
|---|---|---|---|
| 7,386,806 B2 * | 6/2008 | Wroblewski | 715/788 |
| 7,426,734 B2 * | 9/2008 | Debique et al. | 719/310 |
| 7,721,192 B2 * | 5/2010 | Milic-Frayling et al. | 715/230 |
| 2004/0100509 A1 * | 5/2004 | Sommerer et al. | 345/864 |
| 2004/0100510 A1 * | 5/2004 | Milic-Frayling et al. | 345/864 |
| 2006/0117067 A1 * | 6/2006 | Wright et al. | 707/104.1 |

(Continued)

FOREIGN PATENT DOCUMENTS

| | | |
|---|---|---|
| EP | 1806665 A2 | 7/2007 |
| EP | 1840511 A1 | 10/2007 |
| EP | 2196920 A1 | 6/2010 |
| JP | 2009-058922 A | 3/2009 |
| KR | 10-2010-0066606 A | 6/2010 |

OTHER PUBLICATIONS

Communication dated Jan. 2, 2012 issued by the European Patent Office in counterpart European Patent Application No. 11165535.3.

(Continued)

*Primary Examiner* — Angelica Ruiz
(74) *Attorney, Agent, or Firm* — Sughrue Mion, PLLC (57) ABSTRACT

A display apparatus and a displaying method of contents, the display apparatus including a content output unit which outputs contents, a display unit which displays predetermined space information, a user interface (UI) generating unit which generates UI information, a user input unit, and a control unit which classifies the contents into a group which corresponds to a position on the displayed predetermined space information based on predetermined position information of the contents in response to a request to search for contents, being input through the user input unit, controls the UI generating unit to generate a first UI indicating the group, and controls the display unit to display the generated first UI at the corresponding position of the group on the displayed predetermined space information.

24 Claims, 11 Drawing Sheets

(56) References Cited

U.S. PATENT DOCUMENTS

| | | |
|---|---|---|
| 2006/0150215 A1* | 7/2006 | Wroblewski .................. 725/47 |
| 2007/0118794 A1* | 5/2007 | Hollander et al. ............ 715/512 |
| 2009/0060263 A1 | 3/2009 | Tsutsui |
| 2009/0164439 A1* | 6/2009 | Nevins .............................. 707/3 |
| 2009/0204478 A1* | 8/2009 | Kaib et al. ...................... 705/10 |
| 2009/0248688 A1 | 10/2009 | Kim et al. |
| 2009/0300500 A1* | 12/2009 | Arrasvuori .................... 715/723 |
| 2010/0083117 A1* | 4/2010 | Matsumoto .................. 715/731 |
| 2010/0145948 A1 | 6/2010 | Yang |
| 2010/0153386 A1* | 6/2010 | Tysowski ...................... 707/736 |
| 2010/0171763 A1* | 7/2010 | Bhatt et al. .................... 345/660 |
| 2011/0129120 A1* | 6/2011 | Chan ............................. 382/103 |

OTHER PUBLICATIONS

Shih-Hsiang Lo:"Design and Implementation the Incremental Clustering Algorithm for Geotagged Photos on a Map-Enabled Photo Web Service", 2009 Tenth International Conference on Mobile Data Management: Systems, Services and Middleware, May 18, 2009, pp. 666-671, XP031476907.

* cited by examiner

DISPLAY APPARATUS AND DISPLAYING METHOD OF CONTENTS

CROSS-REFERENCE TO RELATED APPLICATION

This application claims priority from Korean Patent Application No. 10-2010-0087516, filed on Sep. 7, 2010 in the Korean Intellectual Property Office, the disclosure of which is incorporated in its entirety herein by reference.

BACKGROUND

1. Field

Apparatuses and methods consistent with the exemplary embodiments relate to a display apparatus and a displaying method of contents, and more particularly, to a display apparatus which is capable of classifying contents into groups and browsing the grouped contents, and a displaying method of contents.

2. Description of the Related Art

Figure 1A:
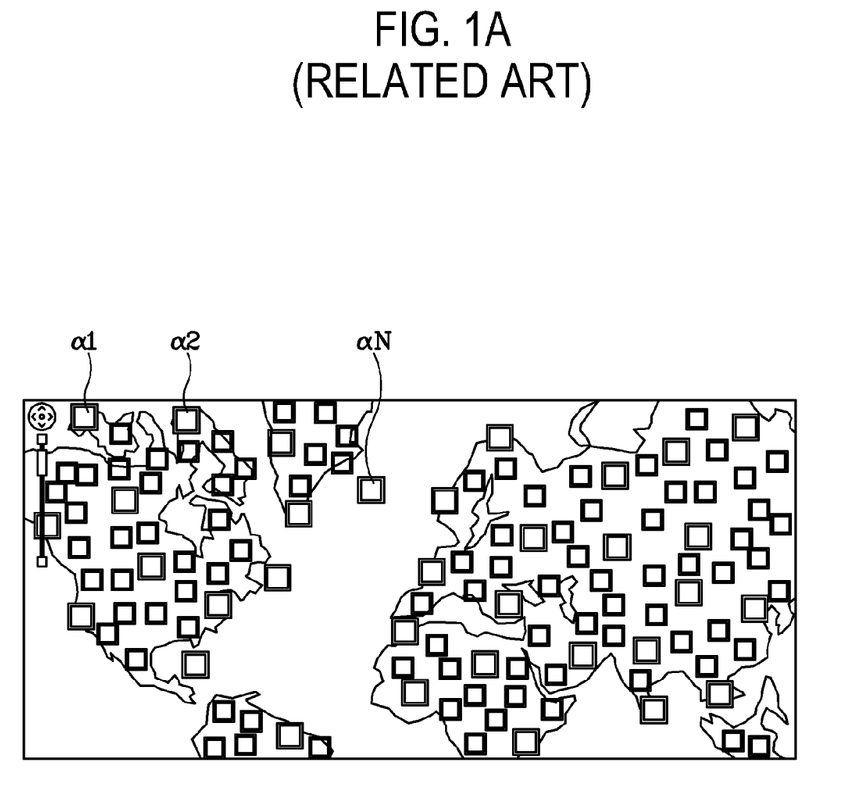
FIGS. 1A to 1C show a contents browsing method of a display apparatus in the related art.

Display apparatuses use various methods to browse contents. Modern display apparatuses may browse contents based on geographical information such as a map. FIG. 1A shows using geographical information of contents ($\alpha 1, \alpha 2, \ldots, \alpha N$) to locate and browse the contents at positions on a map corresponding to the geographical information. However, since a TV does not have a pointing device which is similar to a pointing device in a PC, a user may not easily select contents to be reproduced on a TV if the number of contents ($\alpha 1, \alpha 2, \ldots, \alpha N$) is large. In addition, if there is a plurality of contents corresponding to the geographical information, it is inconvenient for a user to select desired contents since it is difficult to display all of the plurality of contents and a lot of contents information is provided at once.

Figure 1B:
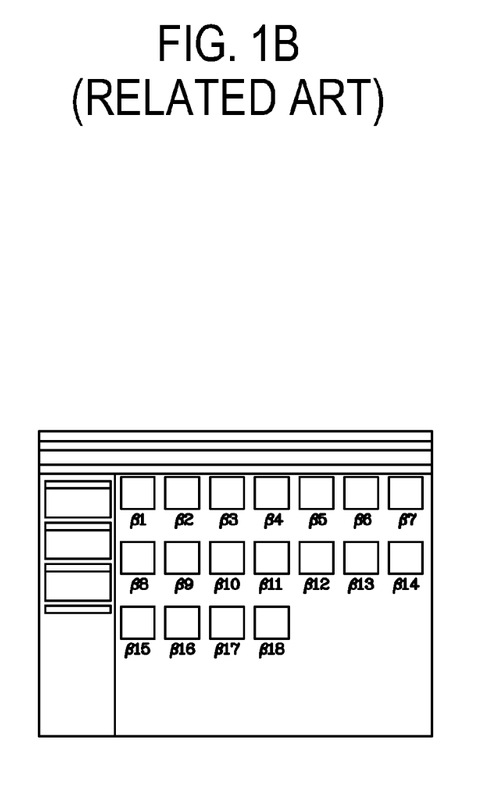

FIG. 1B shows displaying contents ($\beta 1, \ldots, \beta 18$) as thumbnail images. The display in FIG. 1B is inconvenient because, in order to check geographical information related to the contents ($\beta 1, \ldots, \beta 18$), a separate screen has to be displayed which provides separate geographical information.

Figure 1C:
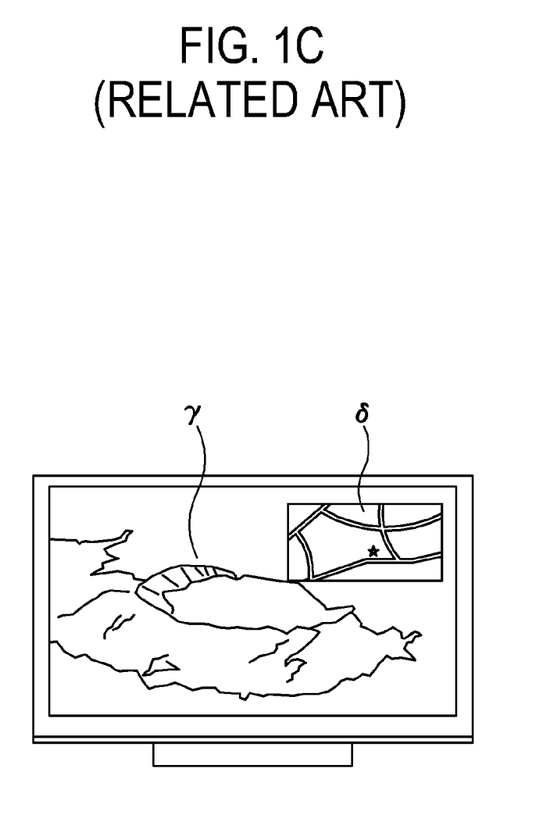

FIG. 1C shows contents ($\gamma$) and geographical information ($\delta$) on which corresponding contents are located. The display in FIG. 1C is inconvenient since a plurality of contents ($\gamma$) corresponding to the geographical information can not be displayed simultaneously.

SUMMARY

Accordingly, one or more exemplary embodiments provide a display apparatus which is capable of classifying and displaying contents into groups on space information based on position information of the contents, and a displaying method of contents.

The foregoing and/or other aspects may be achieved by providing a display apparatus including: a content output unit which outputs at least one contents; a display unit which displays predetermined space information; a UI generating unit which generates UI information; a user input unit; and a control unit which classifies the at least one contents into one or more groups on the displayed predetermined space information based on predetermined position information of the contents if a request for contents search is input through the user input unit, controls the UI generating unit to generate a first UI indicating the one or more groups, and controls the display unit to display the generated first UI on a position corresponding to the groups in the displayed predetermined space information.

The control unit may classify the at least one contents into the predetermined number of groups.

If one of the groups is selected through the user input unit, the control unit may zoom particular space information in, which corresponds to the selected group in the displayed predetermined space information, and classify contents belonging to the selected group into one or more sub groups using at least one of time information and position information of the contents.

The control unit may control the UI generating unit to generate a second UI indicating the one or more sub group, and the control unit may control the display unit to display the generated second UI on a position corresponding to the sub groups in the zoomed-in particular space information.

The control unit may control the display unit to display first UIs indicating remaining groups, which are not selected through the user input unit, on the zoomed-in particular space information.

The control unit may control the display unit to display the first UIs indicating remaining groups, which are not selected through the user input unit, on the zoomed-in particular space information in consideration of a relative positional relation with the first UI indicating the selected group.

The UIs may include at least one of icons symbolizing the groups, the number of contents included in the groups, the kind of contents and thumbnail images of the contents.

The predetermined space information may be zoomed in step by step at a plurality of levels, and the control unit may zoom the particular space information in, with at least one of the plurality of levels skipped, based on the position information of the contents belonging to the selected group.

The predetermined space information may be zoomed in or out step by step at a plurality of levels, and the control unit may zoom the predetermined space information in or out, with at least one of the plurality of levels skipped, based on the position information of the contents belonging to the one or more groups.

If a request for contents search based on time information is input through the user input unit, the control unit may again classify the at least one contents, which are classified into one or more groups based on the position information, into one or more groups based on predetermined time information.

The foregoing and/or other aspects may be achieved by providing a contents displaying method of a display apparatus, including: classifying at least one contents into one or more groups on predetermined space information based on predetermined position information of the contents if a request for contents search is input; generating a first UI indicating the one or more groups; and displaying the generated first UI on a position corresponding to the groups in the displayed predetermined space information.

The classifying may include classifying the at least one contents into the predetermined number of groups.

The contents displaying method may further include, if one of the groups is selected through a user input unit, zooming particular space information in, which corresponds to the selected group in the displayed predetermined space information, and classifying contents belonging to the selected group into one or more sub groups using at least one of time information and position information of the contents.

The contents displaying method may further include: generating a second UI indicating the one or more sub group; and displaying the generated second UI on a position corresponding to the sub groups in the zoomed-in particular space information.

The contents displaying method may further include displaying first UIs indicating remaining groups, which are not selected through the user input unit, on the zoomed-in particular space information.

The displaying may include displaying the first UIs indicating remaining groups, which are not selected through the user input unit, on the zoomed-in particular space information in consideration of a relative positional relation with the first UI indicating the selected group.

The UIs may include at least one of icons symbolizing the groups, the number of contents included in the groups, the kind of contents and thumbnail images of the contents.

The predetermined space information may be zoomed in step by step at a plurality of levels, and the displaying may include zooming the particular space information in, with at least one of the plurality of levels skipped, based on the position information of the contents belonging to the selected group.

The predetermined space information may be zoomed in or out step by step at a plurality of levels, and the method may further include zooming the predetermined space information in or out, with at least one of the plurality of levels skipped, based on the position information of the contents belonging to the one or more groups.

The classifying may include, if a request for contents search based on time information is input, again classifying the at least one contents, which are classified into one or more groups based on the position information, into one or more groups based on predetermined time information.

As described above, exemplary embodiments provide a display apparatus which is capable of classifying and displaying contents into groups on space information based on position information of the contents, and a displaying method of contents, which may improve the accessibility to the contents and make it more convenient to use the contents.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 2:
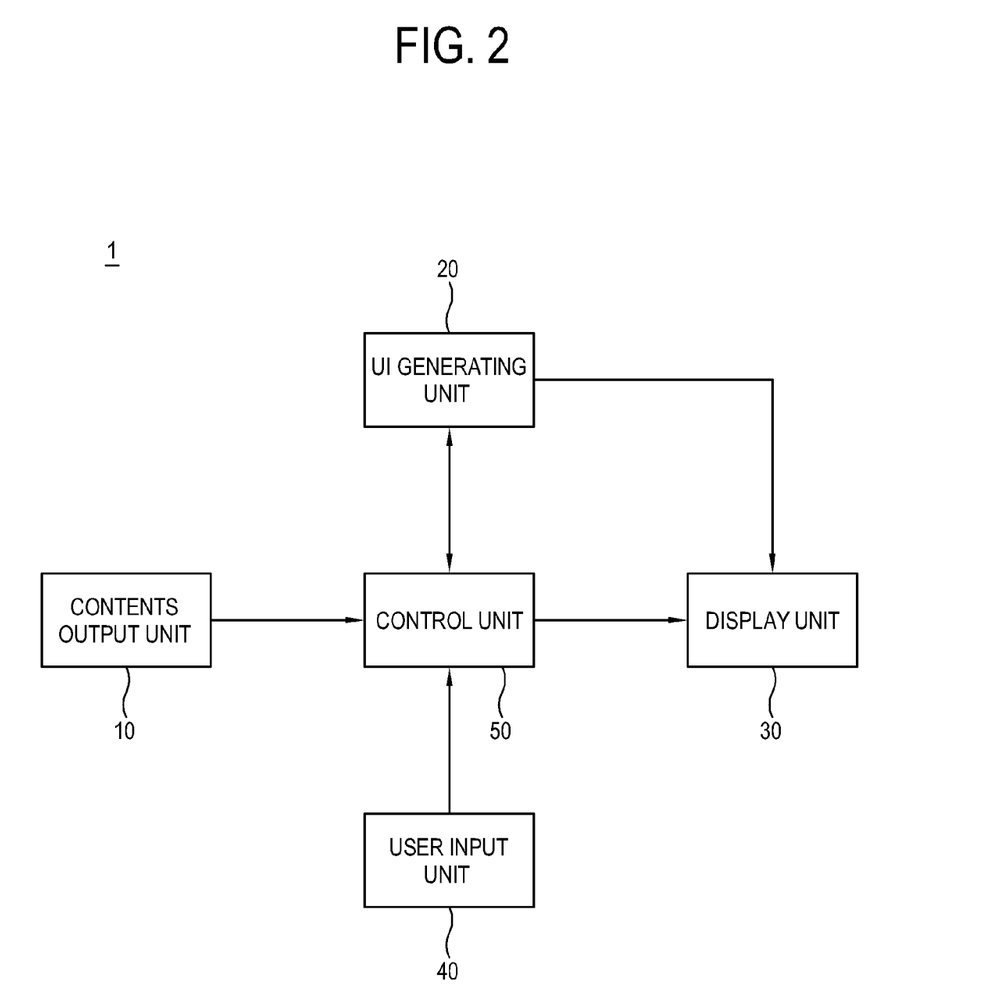
FIG. 2 is a control block diagram of a display apparatus according to an exemplary embodiment.

FIG. 2 is a control block diagram of a display apparatus according to an exemplary embodiment.

As shown, a display apparatus 1 includes a contents output unit 10, a user interface (UI) generating unit 20, a display unit 30, a user input unit 40 and a control unit 50 which controls these components. In this embodiment, the display apparatus 1 is implemented by an apparatus which classifies contents into groups using position information which corresponds to positions on predetermined space information, generates a UI indicating the groups, and displays the generated UI at the corresponding positions of the groups on the space information. For example, the display apparatus 1 may be implemented by a computer system, a television, various kinds of portable terminals, an electronic frame, a contents-contained camera, a camcorder or any other known in the art, all of which include a display unit.

The contents output unit 10 corresponds to an interface which is able to output various multimedia contents. The contents output unit 10 may include a contents storage (e.g., memory) which may store photographs, moving pictures, music files or various kinds of documents, or a connector to which a contents source, such as a camera, a MP3 player, a compact disc (CD)/Blue-ray disc (BD) or the like, may be connected, or any interface which may be connected to any network. For example, the contents output unit 10 may be implemented by a Bluetooth, an infrared communication and wired/wireless USB communication interface or the like. Alternatively, the contents output unit 10 may be implemented by an internal/external storage medium which stores contents such as photographs, moving pictures, music files, various kinds of documents and so on.

The contents include metadata which contain time information and/or space information. The control unit 50 may use the metadata to classify the contents.

Under control of the control unit 50, the UI generating unit 20 generates a first UI which displays groups to which at least one contents output from the contents output unit 10 belong. In addition, under control of the control unit 50, the UI generating unit 20 generates a second UI which displays sub groups into which contents contained in the groups are classified.

The generated first and second UIs may each include at least one of icons symbolizing the groups, the number of contents included in the groups, the kind of contents and thumbnail images of the contents. Examples of the icons may include numbers, characters, symbols, metaphors, pictograms and so on. Examples of the thumbnail images may include thumbnail images for still images, thumbnail images of albums for music files, main scene images for moving pictures and so on. If the contents are documents or various execution files, images related to the names of the contents may be included.

The display unit 30, under control of the control unit 50, displays predetermined space information and displays UIs indicating the groups into which the contents are classified at the corresponding positions on the space information.

The predetermined space information includes any form of information including geographical information, preferably a map. The predetermined space information includes a Maps API service (or Web map service) using a standard interface for sharing geographical information.

The predetermined space information may be zoomed in/out step by step at a plurality of levels. Accordingly, the space information of a certain region corresponding to each of the levels may be displayed on the display unit 30. The display apparatus may further include an image processing unit (not shown) which zooms the predetermined space information in or out on the display unit 30. The image processing unit (not shown) is controlled by the control unit 50. A UI 22 which allows the predetermined space information to be zoomed in/out step by step at a plurality of levels may be generated by the UI generating unit 20 under control of the control unit 50. Accordingly, if a zoomed in/out UI 22 is selected through the user input unit 40, the control unit 50 may control the image processing unit (not shown) so that the space information can be zoomed in/out to the selected level.

The display unit 30 may include a display panel (for example, a liquid crystal display (LCD) panel, an organic light emitting diode (OLED) panel or a plasma display panel (PDP)) and a panel driver which drives the display panel.

The user input unit 40 may receive a user selection such as a request to search for contents, contents selection and so on. The user input unit 40 delivers a preset signal corresponding to the reception of the user selection to the control unit 50 which then performs a control operation corresponding to the preset signal. To this end, the user input unit 40 may be implemented by menu keys (not shown) provided outside of the display apparatus 1, a remote controller (not shown), a touch pad (not shown) or the like. Alternatively, the user input unit 40 may be implemented by a touch screen (not shown) which may be incorporated into the display apparatus 1.

Upon receiving a request to search for contents from the user input unit 40, the control unit 50 may classify the at least one contents into at least one group based on predetermined position information of the at least one contents which corresponds to a position on the displayed predetermined space information, control the UI generating unit 20 to generate the first UI indicating the at least one group, and control the display unit 30 to display the generated first UI on the displayed predetermined space information at a corresponding position of the group. Hereinafter, browsing of the contents classified by the control unit 50 will be described in detail with reference to FIGS. 3 to 7.

Figure 3:
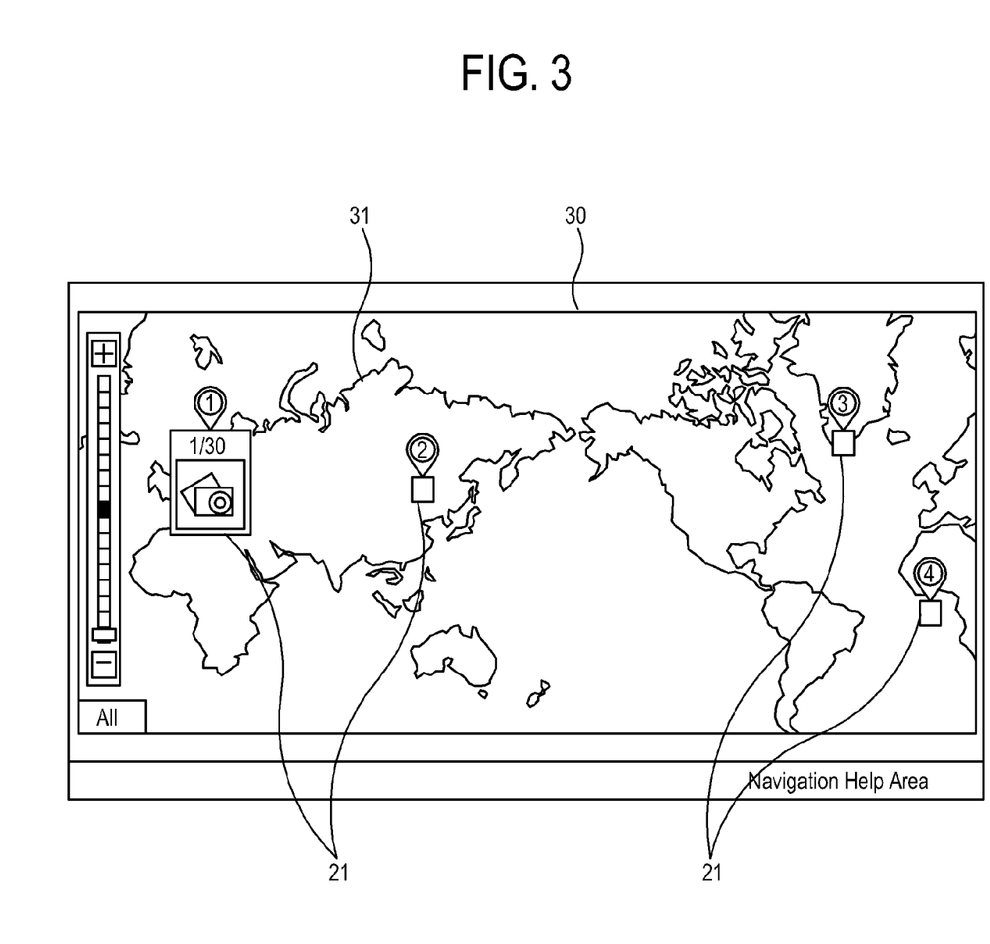
FIG. 3 shows a first example of a contents classification and a display of the display apparatus according to an exemplary embodiment.

FIG. 3 shows a first example of a contents classification and a display of the display apparatus according to an exemplary embodiment.

Upon receiving a request to search for contents from the user input unit 40, the control unit 50 classifies at least one contents, which are output from the contents output unit 10, into a preset number of groups based on predetermined space information 31 using the position information contained in the at least one contents.

The contents contain time information and position information as metadata. Accordingly, the control unit 50 may extract the position information from the metadata and use the extracted position information.

The control unit 50 may classify the at least one contents into the preset number of groups based on the predetermined space information 31. FIG. 3 shows one example where the predetermined space information 31 is represented by an image indicating a world map. Thus, when the space information is the image indicating the world map, the world map is partitioned into N areas using latitude and longitude, and contents having position information belonging to the N areas among the contents output from the contents output unit 10 are classified. In this case, N total groups are formed. The control unit 50 controls the UI generating unit 20 to generate UIs 21 indicating the formed N groups and controls the display unit 30 to locate and display the generated UIs 21 on the corresponding areas of the world map to which the groups belong. The generated UIs 21 may each include at least one of icons symbolizing the groups, the number of contents included in the groups, the kind of contents and thumbnail images of the contents.

In this embodiment, if the display apparatus 1 is a TV, for the purpose of facilitating a user's selection using a remote controller, the control unit 50 may partition the world map into 9 total areas using latitude and longitude and classify the contents output from the contents output unit 10 into 9 total groups. The control unit 50 controls the UI generating unit 20 to generate UIs indicating the 9 groups as numbers and controls the display unit 30 to locate and display the generated numbers at corresponding areas on the world map to which the groups belong. Thus, a user may easily select the groups using numerical keys of the remote controller so that the user can easily view the contents included in the groups.

Figure 4:
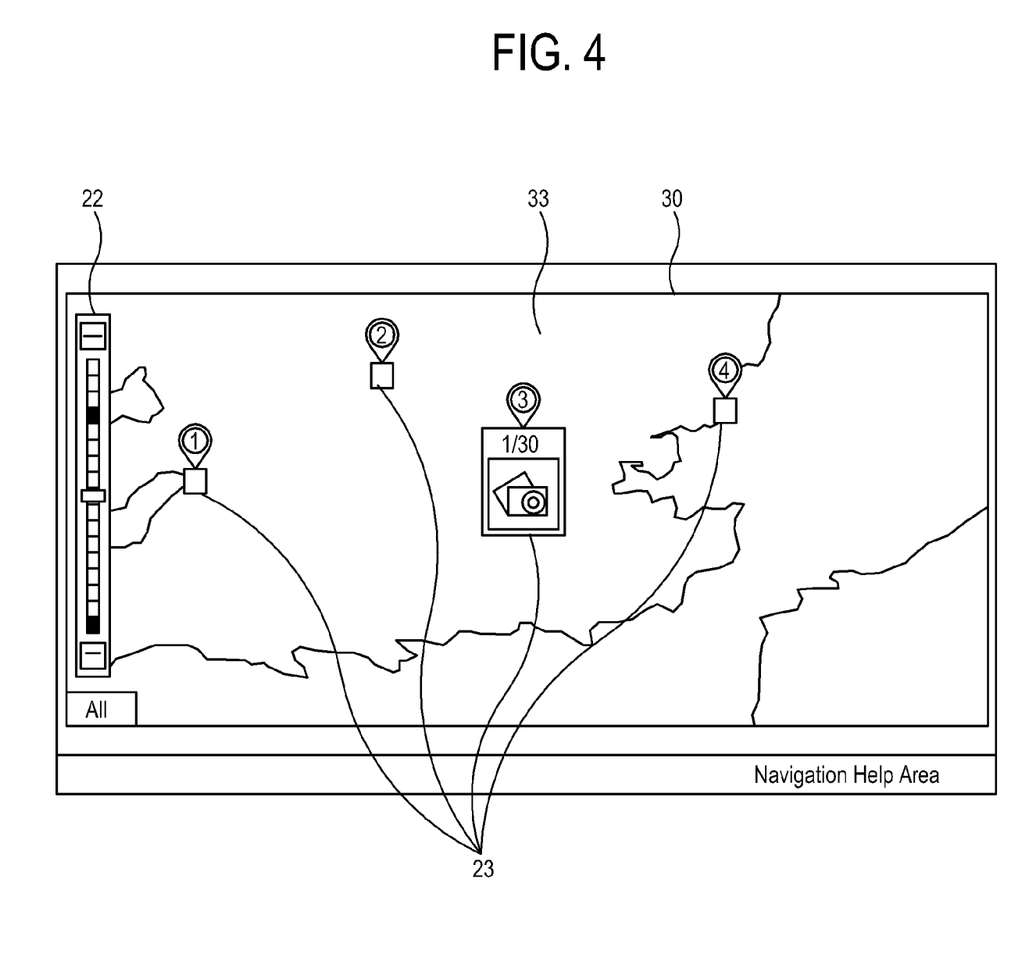
FIG. 4 shows a second example of a contents classification and a display of the display apparatus according to an exemplary embodiment.

FIG. 4 shows a second example of a contents classification and a display of the display apparatus according to an exemplary embodiment.

Predetermined space information 33 and a UI 22 for selection of a plurality of levels to zoom the space information in/out are displayed on the display unit 30.

Upon receiving a request to zoom-in/out the space information at a particular level of the zoom-in/out UI 22 through the user input unit 40, the control unit 50 controls the image processing unit (not shown) to zoom the predetermined space information in/out at the selected level. Accordingly, if the space information is zoomed in at a predetermined level through the zoom-in/out UI 22, an image indicating a particular area of the world map is zoomed in and displayed on the display unit 30 as space information 33, said particular area being smaller than the predetermined space information 31 shown in FIG. 3 which indicates the world map.

The control unit 50 partitions the zoomed-in particular space information 33 into M areas using latitude and longitude and classifies contents having position information belonging to the areas among the contents output from the contents output unit 10 into M total groups. The control unit 50 controls the UI generating unit 20 to generate UIs 23 indicating the M groups and controls the display unit 30 to locate and display the generated UIs 23 at the corresponding areas on the zoomed-in particular space information 33 to which the groups belong. As one example, the M groups may be formed to correspond to the number of character keys provided in the remote controller, and a user may easily select one of the M groups using the character keys of the remote controller so that the user can easily view the contents which belong to the selected group.

Figure 5:
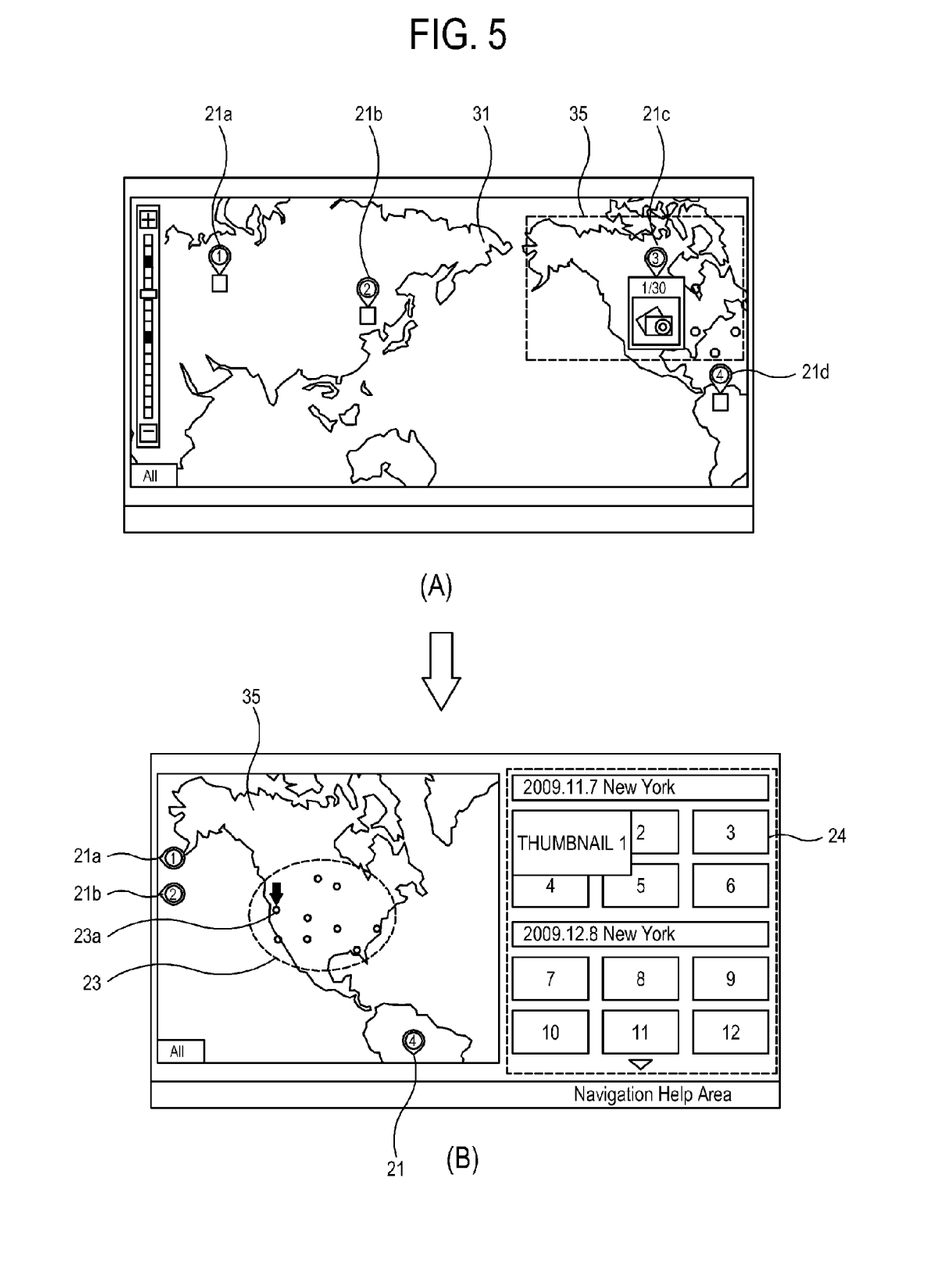
FIG. 5 shows a third example of a contents classification and a display of the display apparatus according to an exemplary embodiment.

FIG. 5 shows a third example of a contents classification and a display of the display apparatus according to an exemplary embodiment.

Upon receiving a request to search for contents through the user input unit 40, the control unit 50 partitions the predetermined space information 31 being currently displayed into 4 total areas and classifies the contents output from the contents output unit 10 into 4 groups corresponding to the 4 areas. The control unit 50 controls the UI generating unit 20 to generate UIs 21a to 21d indicating the 4 groups. Here, the control unit 50 controls the UI generating unit 20 to generate the UIs 21a to 21d as numbers 1 to 4 and controls the display unit 30 to locate and display the generated UIs 21a to 21d at the corresponding areas on the space information to which the groups belong.

At this time, if Group 3 (21c) is selected through the user input unit 40, the control unit 50 zooms in on a map image, which corresponds to particular space information 35 to which Group 3 belongs, on the display unit 30, classifies the contents belonging to Group 3 into sub groups using the position information, and controls the UI generating unit 20 to generate a UI 23 indicating the sub groups on the display unit 30. At this time, the UI 23 indicating the sub groups is displayed with a different kind of icon from the UIs 21a to 21d indicating the groups. As one example, if the UIs 21a to 21d indicating the groups are displayed with numbers, the UI 23 indicating the sub groups may be displayed with characters or symbols.

At this time, the control unit 50 may cause UIs 21a, 21b and 21d indicating Group 1, Group 2 and Group 4, respectively, which are not selected by a user and have been already classified in the space information 31 before Group 3 is selected, to be displayed on the zoomed-in particular space information 35. At this time, the UIs 21a, 21b and 21d indicating Group 1, Group 2 and Group 4, respectively, may be displayed on edges of the zoomed-in particular space information 35. In addition, these UIs 21a, 21b and 21d may be displayed on edges of the zoomed-in particular space information 35 so as to maintain a positional relation with the UI 21c indicating Group 3. For example, in consideration of the positional relation with Group 3, the UIs 21a and 21b indicating Group 1 and Group 2, respectively, may be displayed on a left edge of the zoomed-in particular space information 35, while the UI 21d indicating Group 4 may be displayed on a bottom edge of the zoomed-in particular space information 35.

A user may select the UIs 21a, 21b and 21d indicating Group 1, Group 2 and Group 4, respectively, to jump to the contents included in Group 1, Group 2 and Group 3 without moving to the previous screen such as screen (A) of FIG. 5, so that the user can directly view the contents included in Group 1, Group 2 and Group 4.

This may provide easy transition between plural contents groups and hence increase a user's convenience.

In addition, if a UI 23a indicating one sub group in the UI 23 indicating the sub groups on the zoomed-in particular space information 35 is selected through the user input unit, contents included in the selected sub group may be classified and displayed based on time information 24. In this case, the contents are again classified into second sub groups by date (day, month, year) which may be displayed with thumbnail images (Thumbnail 1, . . . , Thumbnail 12). The user may easily select/move the second sub groups using directional keys of the remote controller.

Figure 6A:
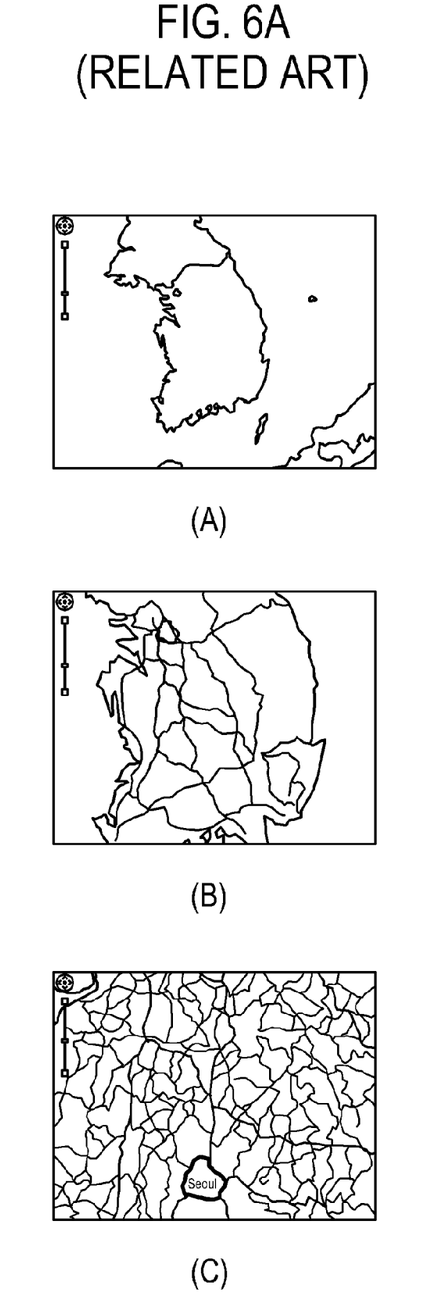
FIGS. 6A and 6B show a fourth example of a contents classification and a display of the display apparatus according to an exemplary embodiment.
Figure 6B:
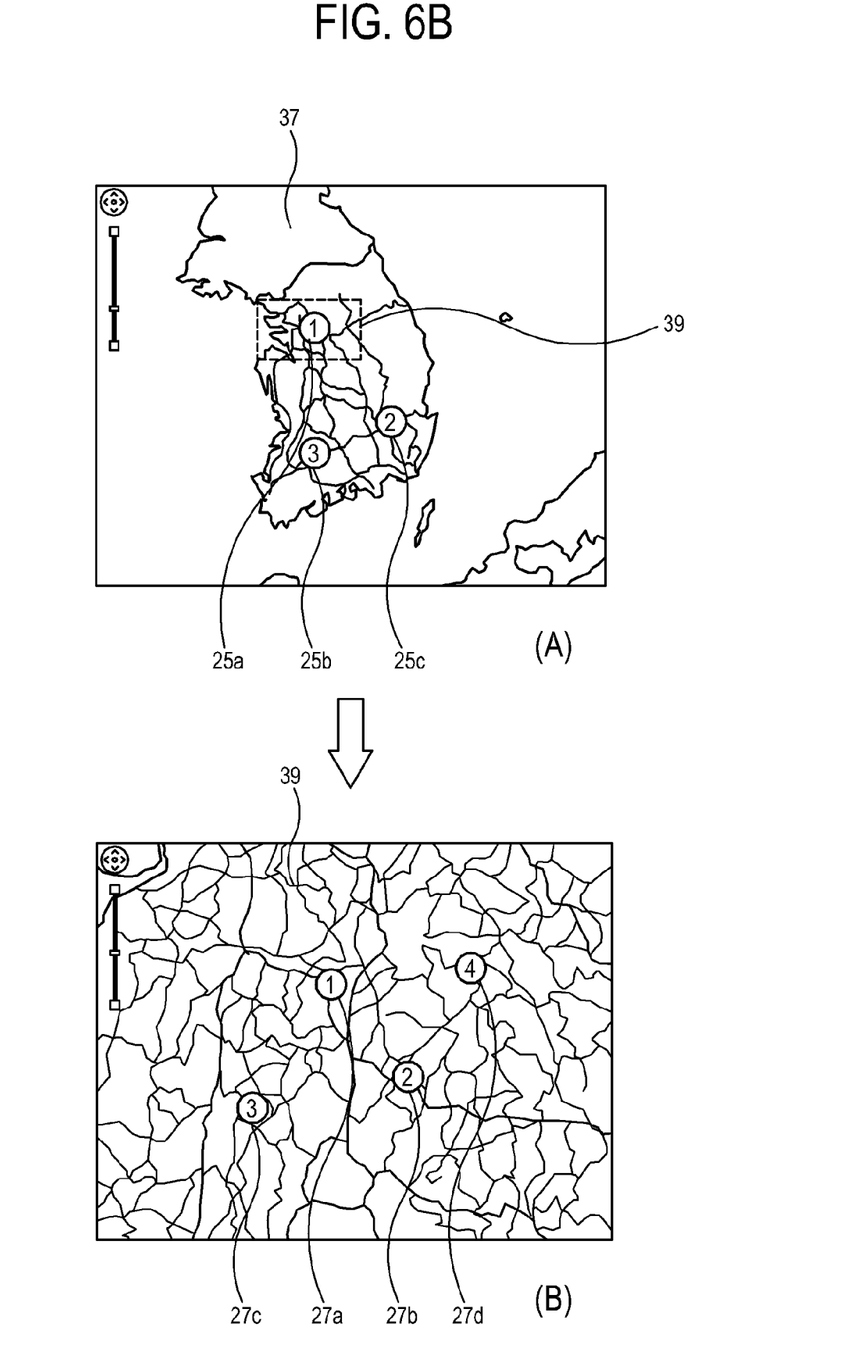

FIG. 6B shows a fourth example of a contents classification and a display of the display apparatus according to an exemplary embodiment.

FIG. 6A shows a zoomed-in view of space information in a conventional display apparatus. The conventional display apparatus always zooms in on the space information step by step at a plurality of levels.

In FIG. 6A, (A) shows the space information zoomed in at Level 2, (B) shows the space information zoomed in at Level 3, and (C) shows the space information zoomed in at Level 4. The conventional display apparatus necessarily zooms in on the space information in the following order: Level 2, Level 3 and Level 4.

On the contrary, the display apparatus according to this embodiment may zoom in or out on space information while skipping at least one of a plurality of levels, as shown in FIG. 6B.

In this embodiment, contents are classified into a specific number of total groups (for example N total groups) in a predetermined space information zoomed in at a specific level (for example Level 2). Then, in response to an input requesting that the predetermined space information be zoomed in to a higher level (for example Level 3), it is determined whether there would be a change in the N groups at Level 3. If there is no change in the N groups at Level 3, then the space information is zoomed in to a higher level (for example Level 4) at which there is a change in the N groups while skipping Level 3. Then, the space information zoomed in at Level 4 may again be classified into M total groups. For example, it is considered that the predetermined space information 37 zoomed in at Level 2 is a map image indicating a territory of 'Korea', the predetermined space information zoomed in at Level 3 is a map image indicating cities, 'Seoul', 'Suwon' and 'Incheon' and the predetermined space information 39 zoomed in at Level 4 is a map image indicating community units, 'Myungdong' and 'Kangnam'. If contents are classified into 3 groups at Level 2, contents are classified into the same 3 groups at Level 3 (having the same contents as classified into the 3 groups at Level 2), and contents are classified into 4 groups at Level 4 (having different contents than the contents classified into the 3 groups at Level 2). Accordingly, when the level of the space information is changed, the space information is zoomed in from Level 2 to Level 4 while skipping Level 3.

As shown, when the predetermined space information 37 zoomed in at Level 2 is displayed on the display unit 30, the control unit 50 partitions the space information 37 into 3 total areas, classifies the contents output from the contents output unit 10 into 3 groups corresponding to the 3 areas using the position information, and controls the UI generating unit 20 to generate UIs 25a, 25b and 25c indicating the 3 groups, respectively, at the corresponding positions on the space information.

If the UI 25a corresponding to Group 1 is selected through the user input unit 40 and it is determined based on the position information of the contents belonging to Group 1 that the level at which the space information in which the contents belonging to Group 1 can be again classified is at Level 4, the space information is directly zoomed in at Level 4 while skipping Level 3, the contents belonging to Group 1 are again classified into a plurality of sub groups using the position information based on the zoomed-in space information 39, and UIs 27a, . . . , 27d indicating the sub groups, respectively, are generated and displayed at the positions corresponding to the sub groups. Thus, the space information which can be displayed step by step at a plurality of levels based on the position information of contents can be zoomed in and displayed with at least one of the plurality of levels skipped. This may be equally applied to zooming-out.

Figure 7:
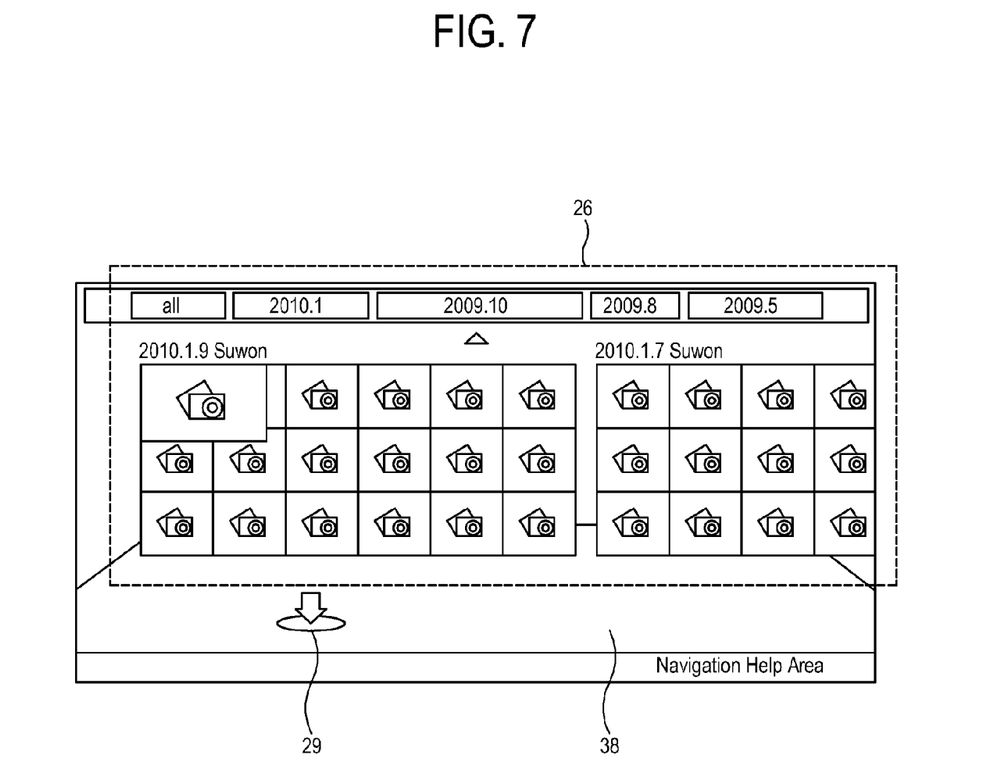
FIG. 7 shows a fifth example of a contents classification and a display of the display apparatus according to an exemplary embodiment.

FIG. 7 shows a fifth example of a contents classification and a display of the display apparatus according to an exemplary embodiment.

Upon receiving a request to search for contents from the user input unit 40, the control unit 50 may classify at least one contents which is output from the contents output unit 10 by date (day, month, year) using the time information of the contents. This may be applied to the first to fourth examples. Accordingly, the control unit 50 may classify the contents into the predetermined number of groups on the predetermined space information using the position information and again classify contents included in the groups into sub groups using the time information. At this time, the control unit 50 may control the display unit 30 to display the sub groups which have been classified based on the predetermined space information and the time information simultaneously. As shown, in response to a UI 29 indicating one of the groups classified based on predetermined space information 38 being selected and a request for searching the contents belonging to the selected group based on the time information being input through the user input unit 40, the contents belonging to the selected group may be classified and displayed by date (day, month, year) 26.

As another example, although it has been illustrated in the fifth example that contents are classified into N groups using the position information of the contents based on the predetermined space information, if a request to search all contents corresponding to the predetermined space information 38 based on the time information is input through the user input unit 40, the contents may be again classified into M groups by date (day, month, year).

Figure 8:
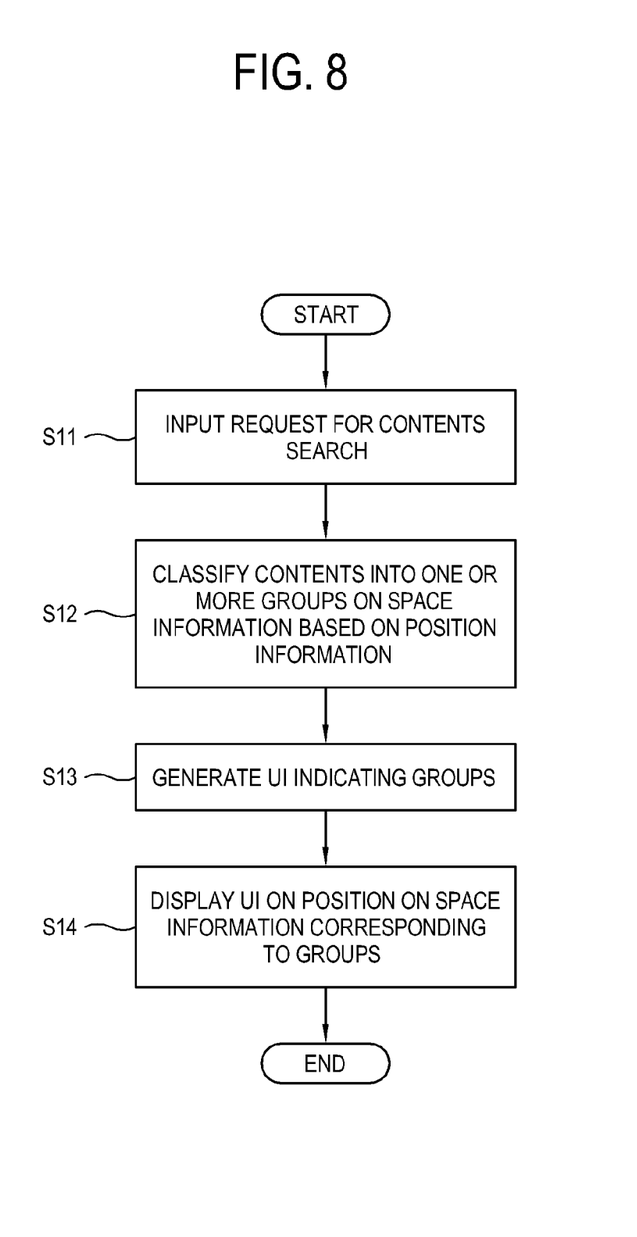
FIG. 8 is a flow chart showing a control operation of the display apparatus according to an exemplary embodiment.

FIG. 8 is a flow chart showing a control operation of the display apparatus according to an exemplary embodiment.

If a request to search for contents is input through the user input unit 40 (S11), the control unit classifies contents output from the contents output unit 10 into at least one group which corresponds to a position on predetermined space information using position information of the contents (S12), generates a UI indicating the group (S13), and causes the generated UI to be displayed at the corresponding on the space information (S14).

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A display apparatus comprising:
   a content output unit which outputs contents having position information on a map corresponding to geographical information;
   a display unit which displays an image that indicates geographical space information;
   a user interface (UI) generating unit which generates at least one first UI corresponding to a partitioned area of the image;
   a user input unit; and
   a control unit,
   wherein the control unit, using a processor, partitions a portion of the image into the partitioned area and classifies the contents into a group that corresponds to the partitioned area in response to a request to search for contents, being input through the user input unit,
   wherein the control unit, using a processor, controls the UI generating unit to generate the at least one first UI indicating the content of the group,
   wherein the control unit, using a processor, controls the display unit to display the generated at least one first UI on the displayed image at a position of the image corresponding to the position information of the content of the group,
   wherein the control unit classifies the contents into the group which is of a predetermined number of groups wherein each of the predetermined number of groups corresponds to one of a plurality of partitioned areas of the image, and
   wherein, in response to the group being selected through the user input unit, the control unit controls the display unit to zoom in on the displayed image to display a particular image which corresponds to the selected group, and classifies contents belonging to the selected group into one or more sub groups using at least one of time information and position information of the contents.

2. The display apparatus according to claim 1,
   wherein the control unit controls the UI generating unit to generate one or more second UIs indicating the one or more sub groups respectively, and
   wherein the control unit controls the display unit to display the generated one or more second UIs at positions corresponding to the one or more sub groups on the zoomed-in particular image.

3. The display apparatus according to claim 1, wherein the control unit controls the display unit to display UIs indicating remaining groups, which are not selected through the user input unit, on the zoomed-in particular image.

4. The display apparatus according to claim 3, wherein the control unit controls the display unit to display the UIs indicating the remaining groups at positions which maintain a relative positional relation with the first UI indicating the selected group.

5. The display apparatus according to claim 4, wherein the first UI, the one or more second UIs, and the UIs indicating the remaining groups comprise at least one of icons symbolizing the groups, the number of contents included in the groups, the kind of contents, and thumbnail images of the contents.

6. The display apparatus according to claim 1,
   wherein the image is zoomed in step by step at a plurality of levels, and
   wherein the control unit zooms in on the particular image, with at least one of the plurality of levels skipped, based on the position information of the contents belonging to the selected group.

7. The display apparatus according to claim 1,
   wherein the image is zoomed in or out step by step at a plurality of levels, and
   wherein the control unit zooms in or out on the image, with at least one of the plurality of levels skipped, based on the position information of the contents belonging to the group.

8. The display apparatus according to claim 1, wherein, in response to a request to search for contents based on time information being input through the user input unit, the control unit again classifies the contents, which are classified into the group based on the position information, into one or more other groups based on predetermined time information.

9. A contents displaying method of a display apparatus, comprising:
   partitioning, using a processor, an image that indicates geographical space information into a plurality of partitioned areas;
   classifying, using the processor, contents having position information on a map corresponding to geographical information into a group that corresponds to at least one area of the plurality of partitioned areas in response to a request to search for contents being input;
   generating at least one first user interface (UI) indicating the content of the group, wherein the at least one first UI corresponds to the at least one area of the image;
   displaying the generated at least one first UI on the image that indicates geographical space information, at a position on the image corresponding to the position information of the content of the group,
   wherein the classifying comprises classifying the contents into the group which is of a predetermined number of groups, wherein each of the predetermined number of groups corresponds to one of the plurality of partitioned areas of the image;

zooming in on the displayed image so as to display a particular image, which corresponds to the selected group, in response to the group being selected through a user input unit; and classifying contents belonging to the selected group into one or more sub groups using at least one of time information and position information of the contents.

10. The contents displaying method according to claim 9, further comprising:
generating one or more second UIs indicating the one or more sub groups respectively; and
displaying the generated one or more second UIs at positions corresponding to the one or more sub groups on the zoomed-in particular image.

11. The contents displaying method according to claim 9, further comprising displaying UIs indicating remaining groups, which are not selected through the user input unit, on the zoomed in particular image.

12. The contents displaying method according to claim 11, wherein the displaying comprises displaying the UIs indicating the remaining groups at positions which maintain a relative positional relation with the first UI indicating the selected group.

13. The contents displaying method according to claim 12, wherein the first UI, the one or more second UIs, and the UIs indicating the remaining groups include at least one of icons symbolizing the groups, the number of contents included in the groups, the kind of contents and thumbnail images of the contents.

14. The contents displaying method according to claim 9, wherein the image is zoomed in step by step at a plurality of levels, and
wherein the displaying comprises zooming in on the particular image, with at least one of the plurality of levels skipped, based on the position information of the contents belonging to the selected group.

15. The contents displaying method according to claim 9, wherein the image is zoomed in or out step by step at a plurality of levels, the method further comprising zooming in or out on the image, with at least one of the plurality of levels skipped, based on the position information of the contents belonging to the group.

16. The contents displaying method according to claim 9, wherein the classifying comprises, in response to a request to search for contents based on time information being input, again classifying the contents, which are classified into the group based on the position information, into one or more other groups based on predetermined time information.

17. A display apparatus comprising:
a display unit which is configured to display an image;
at least one processors in the apparatus which is operable to partition a portion of the image into the partitioned area, to classify the contents into a group that corresponds to the partitioned area in response to a request to search for contents, being input through the user input unit, to generate the at least one first UI indicating the content of the group, to display the generated at least one first UI on the displayed image at a position of the image corresponding to the position information of the content of the group, to classify the contents into the group which is of a predetermined number of groups wherein each of the predetermined number of groups corresponds to one of a plurality of partitioned areas of the image,
wherein, in response to the group being selected by a user, the processor is operable to zoom in on the displayed image to display a particular image which corresponds to the selected group, and to classify contents belonging to the selected group into one or more sub groups using at least one of time information and position information of the contents.

18. The display apparatus according to claim 17, wherein the processor includes a user interface (UI) generating unit which generates the first UI corresponding to the partitioned area of the image,
wherein the processor is operable to control the UI generating unit to generate one or more second UIs indicating the one or more sub groups respectively, and to control the display unit to display the generated one or more second UIs at positions corresponding to the one or more sub groups on the zoomed-in particular image.

19. The display apparatus according to claim 17, wherein the processor is operable to control the display unit to display UIs indicating remaining groups, which are not selected through the user input unit, on the zoomed-in particular image.

20. The display apparatus according to claim 19, wherein the processor is operable to control the display unit to display the UIs indicating the remaining groups at positions which maintain a relative positional relation with the first UI indicating the selected group.

21. The display apparatus according to claim 20, wherein the first UI, the one or more second UIs, and the UIs indicating the remaining groups comprise at least one of icons symbolizing the groups, the number of contents included in the groups, the kind of contents, and thumbnail images of the contents.

22. The display apparatus according to claim 17, wherein the image is zoomed in step by step at a plurality of levels, and
wherein the processor is operable to zoom in on the particular image, with at least one of the plurality of levels skipped, based on the position information of the contents belonging to the selected group.

23. The display apparatus according to claim 17, wherein the image is zoomed in or out step by step at a plurality of levels, and
wherein the processor is operable to zoom in or out on the image, with at least one of the plurality of levels skipped, based on the position information of the contents belonging to the group.

24. The display apparatus according to claim 17, wherein, in response to a request to search for contents based on time information being input through the user input unit, the processor is operable to reclassify the contents, which are classified into the group based on the position information, into one or more other groups based on predetermined time information.

* * * * *